United States Patent Office 3,518,189
Patented June 30, 1970

3,518,189
GREASE COMPOSITION FOR USE AT HIGH
TEMPERATURES AND HIGH SPEEDS
John B. Christian, Yellow Springs, Ohio, assignor to the United States of America as represented by the Secretary of the Air Force
No Drawing. Continuation-in-part of application Ser. No. 453,529, May 5, 1965. This application Jan. 3, 1968, Ser. No. 696,971
Int. Cl. C10m 7/50, 7/30, 7/02
U.S. Cl. 252—28      2 Claims

ABSTRACT OF THE DISCLOSURE

A grease composition useful under high pressure and temperature conditions consisting by weight of 58.5 to 64.5% of an inhibited organosiloxane fluid, 35 to 40% ammeline, and 0.5 to 1.5% of finely divided silica having particles ranging in diameters from 0.015 to 0.02 micron.

---

The invention described herein may be manufactured and used by or for the United States Government for governmental purposes without payment to me of any royalty thereon.

CROSS-REFERENCES TO RELATED APPLICATIONS

This application is a continuation-in-part of U.S. patent application Ser. No. 453,529 filed May 5, 1965, by John B. Christian and now abandoned.

BACKGROUND OF THE INVENTION

In the art of grease-type lubricants, high temperature characteristics have been achieved by the use of a variety of organosiloxane fluids to which have been added an even wider variety of organic and inorganic fillers or thickeners such as graphite, clay, carbon black, silica gel, fumed silica and the like. While the inherent resistance of the organosiloxane fluids to thermal degradation has substantially increased the temperatures at which lubricants generally may be expected to perform, the full high-temperature potential of such fluids has not been easily achieved in the case of greases. Indeed, it has been difficult to formulate a mixture capable of retaining its grease-like characteristics at elevated temperatures, particularly under high loadings, at high speeds, in oxidative atmospheres or under slightly reduced atmospheric pressures or the like.

More recently developed grease compositions, by the use of specific fillers, thickeners and the like in connection with specific silicone fluids, have been made to possess one or more of the properties desired in modern day greases although this has often been at the sacrifice of some other desired property. Moreover, the development of such precise formulations has tended to make the resulting greases highly specialized in that they have not been capable of performing over a wide range of environmental conditions. For example, while it has been possible to formulate a grease that would retain its grease-like consistency at elevated temperatures under high speed operation, such a grease would not be satisfactory for use at low speeds under a heavy load. Similarly, most greases which have been compounded for satisfactory operation at elevated temperatures have been too stiff or otherwise unsuitable for use at lower temperatures. Similarly a grease that would perform satisfactorily in roller bearings, for example, would be inadequate where sliding or oscillatory motions were encountered. As might be expected, refinements of the organosiloxane fluids themselves, as for example by the addition of certain oxidation or deterioration inhibitors thereto, has for the most part only further increased the specialization of greases formed therefrom by limiting their performance capabilities to an ever narrowing range of operating conditions.

SUMMARY OF THE INVENTION

Specifically, this invention relates to an improved grease composition and particularly to a grease which will perform satisfactorily for prolonged periods of time at high temperatures and at high speed operation.

It is accordingly an object of the present invention to provide an improved grease composition which can be used at high temperatures and in high speed applications and will also perform under a wide range of less severe operating conditions.

Still another object of the present invention is to provide such a universal grease composition based upon an organosiloxane base fluid and particularly an inhibited silicone fluid.

Yet another object to the invention is to provide a grease which can operate under light or heavy loads at temperatures ranging from below freezing to about 600 degrees Fahrenheit, at both low and high rotational speeds and under reduced pressure.

Yet another object of the invention is to provide a grease which can be used to provide lubrication between parts involved in a variety of motions such as sliding, rolling, oscillatory and the like.

Yet another object of the invention is to provide an all-purpose grease for use on high-speed, high-altitude aircraft and aerospace vehicles.

DESCRIPTION OF THE PREFERRED EMBODIMENTS

To achieve these and other objects and advantages which will appear from a reading of the within disclosure, this invention teaches the admixture with an organosiloxane base fluid, and particularly with an inhibited silicone fluid, of a tri-substituted triazine powder as a thickener and of a very small amount of a very fine silica powder as an auxiliary thickener. It was totally unobvious that the silica might impart any desirable characteristics to the formulation because the high free surface energy of the silica particles has been known to destroy the stability of the grease even at moderately high temperatures. As hereinafter set forth, however, the addition of the silica to the specific grease here involved substantially improves its performance capabilities.

The preferred triazine thickener is a finely divided powder of ammeline according to the formula

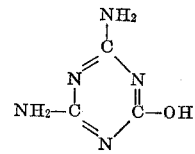

The silica is also a very fine powder, the particles of which range in diameter from .015 to .02 micron and provide a surface area of from 175 to 200 square meters per gram of the material. Particularly suitable for use in this invention has been found to be such a silica which is available in a purity of from 99 to 99.7 percent from Godfrey L. Cabot, Inc. of Boston, Mass. under its proprietary name and trade designation "Cabosil H–5."

To obtain a consistency that may be considered grease-like, it is necessary to employ the ammeline powder in a weight ratio of not less than thirty-five parts to 100 parts of the total composition. On the other hand, increasing the amount of ammeline beyond forty parts by weight to 100 parts by weight of the total grease has been found to interfere with its performance characteristics. Although, as noted above, silica has been generally regarded as undesirable as an additive to the silicone fluids and although in the case of the grease of this invention it has been found that incorporation of the silica in quantities greater than one and one-half weight percent of the total grease will cause it to lose its stability and grease-like consistency even while standing on a shelf at room temperature, its incorporation in the preferred range provides significant improvement in certain properties as is demonstrated by the test results hereinafter set forth. On the other hand, reducing the silica content to less than one-half weight percent appears to eliminate such improvements.

Accordingly, the preferred grease compositions according to this invention consist of an admixture with from 58.5 to 64.5 parts by weight of the Dow Corning Corporation QF6-7039 inhibited silicone as a base fluid, of from 35 to 40 parts by weight of the powdered ammeline, and of from 0.5 to 1.5 parts by weight of the Godfrey L. Cabot Cabosil H-5 silica powder. The structural formula of the silicone is

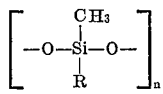

where R is a phenyl group, $n$ is an integer from 1 to 3 and —Si(CH)$_3$ groups are chain stoppers.

The inhibitor incorporated therewith is an iron salt of an organic acid such as iron octoate. These ingredients are admixed according to conventional grease manufacturing techniques, for example by the manual addition of the thickening powders to the silicone base fluid in an internal mixture or the like or while stirring until that consistency is achieved at which the final powder must be added by spatula mixing.

Greases formulated of the ingredients and according to the preferred proportions above enumerated demonstrated a dropping point, when tested according to Federal Test Method Standard 791, Method Number 1421, of higher than 650 degrees Fahrenheit. Penetration testing according to American Society for Testing Materials Method Number D217 gives values of from 270 to 340 in both the unworked and worked condition demonstrating the maintenance of the stability of the grease through working conditions. Further testing of these greases according to Military Specification MIL-G-38277 discloses oil separation at 600 degrees Fahrenheit of only from sixteen to twenty percent; while Federal Test Method Standard 791, Method 350 testing discloses evaporation at 600 degrees Fahrenheit of only from twenty-five to twenty-eight percent. Testing according to American Society for Testing Materials Method Number D-1478 shows low temperature torque at twenty-five degrees Fahrenheit of from 760 to 1120 gram-centimeters at starting and of from 530 to 800 gram-centimeters after running. On the Pope Spindle Test, under a five-pound load at 20,000 r.p.m. and 600 degrees Fahrenheit, the grease operated satisfactorily for from 150 to 200 hours. Testing according to Federal Test Method Standard 791, Method Number 3453 for oxidation stability of these greases disclosed a drop of two pounds. Moreover, actual use of these compounds as all-purpose greases for high-speed, high-altitude aircraft has proven that they continue to perform satisfactorily in the low pressure conditions normally encountered at altitudes on the order of 100,000 feet above sea level, under both light and heavy loads, at both low and high temperatures up to beyond 600 degrees Fahrenheit, at both low and high rotational speeds, under various types of motion and in various types of bearings.

By way of comparison, a grease containing 65 parts by weight of the same inhibited silicone fluid and thirty-five percent by weight of the same ammeline but no silica had a dropping point according to Federal Test Method Standard 791, Method Number 1421 of only 600 degrees Fahrenheit. On the same grease, the unworked penetration value obtained from ASTM Method Number D217 ranged from 350 to 410; and the Pope Spindle Test at 600 degrees Fahrenheit under five-pound loading at 20,000 revolutions per minute gave a performance interval of from 130 to 150 hours. By way of further comparison, grease formulations based upon the silicone fluid and containing silica as the sole thickener become so soft at temperatures on the order of 600 degrees Fahrenheit that they are considered to be liquids rather than greases.

While the invention has been here described in considerable detail in connection with certain specific embodiments thereof, it is to be understood that the foregoing particularization has been for the purposes of illustration only and does not limit the scope of the invention as it is defined in the subjoined claims.

I claim:
1. A grease composition comprising
(a) 58.5 to 64.5 parts by weight of an inhibited silicone base fluid of the structure

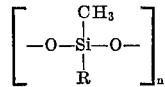

where R is a phenyl group, $n$ is an integer from 1 to 3, and the inhibitor is iron octoate and Si(CH)$_3$ groups are chain stoppers;
(b) 35 to 40 parts by weight of 2,4-diamino-6-hydroxy-1,3,5-triazine thickener; and
(c) from 0.5 to 1.5 parts by weight of silica as an auxiliary thickener.
2. The composition of claim 1 in which the silica particles are from .015 to .02 micron in diameter.

References Cited

UNITED STATES PATENTS

| | | | |
|---|---|---|---|
| 2,984,624 | 5/1961 | Halter et al. | 252—49.6 |
| 3,160,590 | 12/1964 | McCarthy | 252—28 |
| 3,160,591 | 12/1964 | Halter et al. | 252—49.6 |
| 3,235,495 | 2/1966 | Buehler | 252—49.6 |
| 3,267,031 | 8/1966 | Buehler | 252—49.6 |
| 3,309,312 | 3/1967 | Buehler | 252—49.6 |
| 3,350,309 | 10/1967 | Buehler | 252—49.6 |

DANIEL E. WYMAN, Primary Examiner

I. VAUGHN, Assistant Examiner

U.S. Cl. X.R.

252—49.6